United States Patent
Midholt et al.

(10) Patent No.: US 9,921,658 B2
(45) Date of Patent: Mar. 20, 2018

(54) DEVICE AND METHOD FOR DETECTING GESTURES ON THE SKIN

(71) Applicant: Sony Corporation, Tokyo (JP)

(72) Inventors: Magnus Midholt, Lund (SE); Ola Thorn, Lund (SE); David de Leon, Lund (SE)

(73) Assignee: Sony Mobile Communications, Inc., Tokyo (JP)

( * ) Notice: Subject to any disclaimer, the term of this patent is extended or adjusted under 35 U.S.C. 154(b) by 114 days.

(21) Appl. No.: 14/374,276

(22) PCT Filed: Feb. 6, 2014

(86) PCT No.: PCT/IB2014/000109
§ 371 (c)(1),
(2) Date: Jul. 24, 2014

(87) PCT Pub. No.: WO2015/118368
PCT Pub. Date: Aug. 13, 2015

(65) Prior Publication Data
US 2015/0220154 A1    Aug. 6, 2015

(51) Int. Cl.
*G09G 5/00*    (2006.01)
*G06F 3/01*    (2006.01)

(52) U.S. Cl.
CPC ............. *G06F 3/017* (2013.01); *G06F 3/011* (2013.01); *G06F 3/014* (2013.01)

(58) Field of Classification Search
CPC .................. G06F 3/00–3/04897; G06G 3/011
See application file for complete search history.

(56) References Cited

U.S. PATENT DOCUMENTS

| | | | |
|---|---|---|---|
| 6,925,410 B2* | 8/2005 | Narayanan | 702/150 |
| 2010/0259472 A1 | 10/2010 | Radivojevic | |
| 2011/0107270 A1* | 5/2011 | Wang | G06F 19/3437 715/850 |
| 2011/0248914 A1 | 10/2011 | Sherr | |
| 2014/0139454 A1* | 5/2014 | Mistry et al. | 345/173 |

FOREIGN PATENT DOCUMENTS

WO    2009044967    4/2009

OTHER PUBLICATIONS

Masa Ogata et al. (SenSkin: Adapting Skin as a Soft Interface, Oct. 8-11, 2013, ACM, pp. 539-543).*
International Search Report and Written Opinion dated Jul. 3, 2014 for corresponding International Application No. PCT/IB2014/000109.

* cited by examiner

*Primary Examiner* — Hang Lin
(74) *Attorney, Agent, or Firm* — Renner, Otto, Boisselle & Sklar, LLP

(57) ABSTRACT

A device and method in accordance with the present disclosure provide an input to an electronic device via a gesture performed by a user. A distortion of the user's skin surface due to a gesture performed on the user's skin surface is detected, and a characteristic of the detected distortion is determined. Based on the determined characteristic, the gesture performed on the user's skin surface is determined.

18 Claims, 3 Drawing Sheets

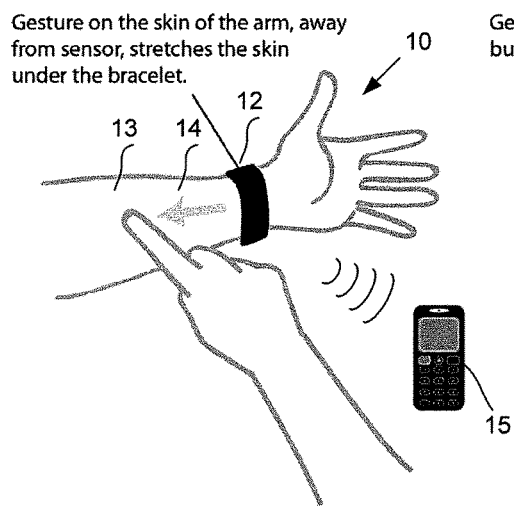
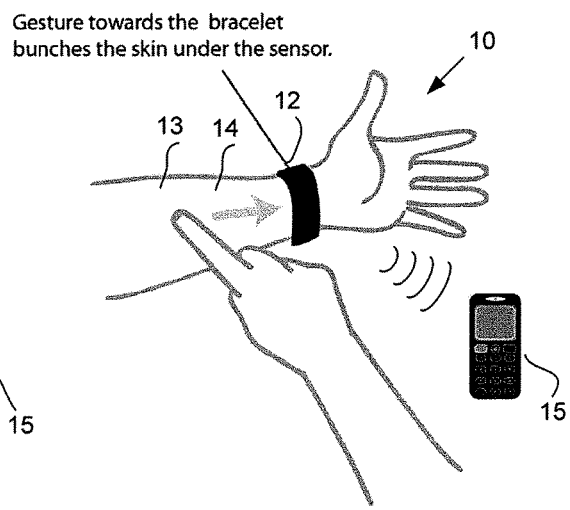
FIG. 1A  FIG. 1B
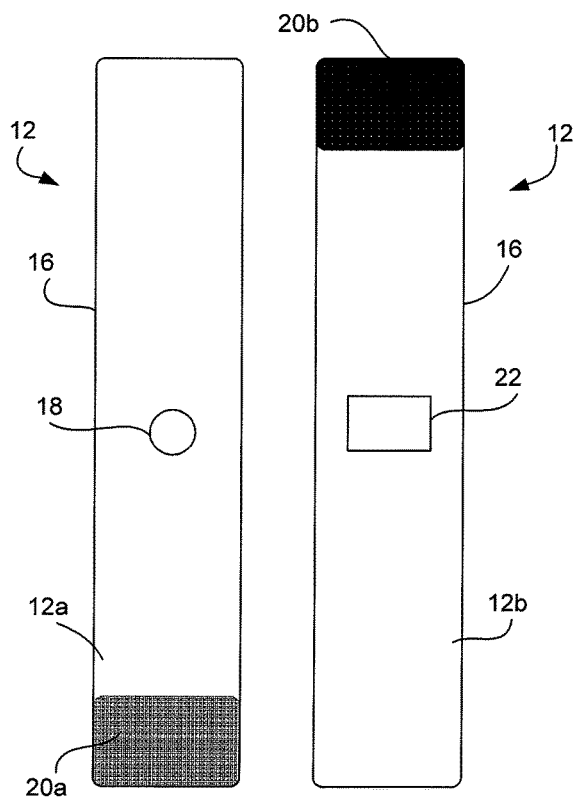
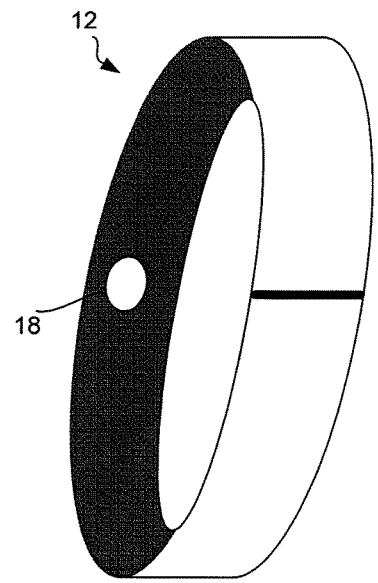
FIG. 2A  FIG. 2B  FIG. 2C

DEVICE AND METHOD FOR DETECTING GESTURES ON THE SKIN

This application is a national phase of International Application No. PCT/IB2014/000109 filed Feb. 6, 2014 and published in the English language.

TECHNICAL FIELD OF THE INVENTION

The technology of the present disclosure relates generally to electronic devices and, more particularly, to an apparatus, system and method for detecting gestures on skin.

BACKGROUND

As computer processors have decreased in size and expense, mobile electronic devices, such as mobile phones, tablets, etc., have become increasingly widespread. Designed to be portable, many mobile electronic devices are lightweight and small enough to be worn or carried in a pocket or handbag. However, the portability of modern mobile electronic devices comes at a price: today's mobile electronic devices often incorporate small input devices to reduce the size and weight of the device. For example, many current mobile electronic devices include soft QWERTY keyboards displayed on a touch screen that many people (especially those with poor dexterity) find difficult to use.

Gesture-based input means provide an alternative to conventional input means (e.g., keyboards, touch screens, etc.) provided on mobile electronic devices. Moreover, gesture-based input means are not constrained by the size of the mobile electronic device and, thus, can provide a larger area for inputting data to the mobile electronic device.

One gesture-based input means that has recently been proposed is the "Skinput" concept, in which a user interface is projected on a surface of the user's arm and the user performs gestures on the surface of the arm in the form of "taps". The location of the "taps" is determined based on acoustic data obtained from acoustic sensors. An input command then is issued based on the determined location.

SUMMARY

A drawback of the "Skinput" set-up is that it requires the user to wear a tight fitting bracelet on the upper arm. Compared to a wrist-worn device, an upper-arm mounted device is unlikely to gain user acceptance.

In accordance with the present disclosure, an apparatus, system and method are provided for detecting gestures based on skin distortion. More particularly, as a gesture is performed on the surface of the skin, skin distortion due to the gesture is detected via a sensor such as, for example, an optical sensor. The gesture then is identified based on the detected skin distortion. An input command corresponding to the identified gesture then can be issued for use by the electronic device.

The apparatus, system and method in accordance with the present disclosure are advantageous for a number of reasons. For example, the sensor used to detect skin distortion is inexpensive, and also can double as a pulse monitor. Further, the interactive possibilities of wearable devices is significantly extended using simple to execute gestures on the arm.

According to one aspect of the invention, a method of determining a gesture performed by a user includes: detecting a distortion of the user's skin surface due to a gesture performed on the user's skin surface; determining a characteristic of the detected distortion; and based on the determined characteristic, determining the gesture performed on the user's skin surface.

According to one aspect of the invention, determining the gesture includes comparing the characteristic of the detected skin distortion to a plurality entries stored in a database, each entry including skin distortion data corresponding to skin distortion due to a predetermined gesture.

According to one aspect of the invention, the method includes retrieving an input command assigned to the detected gesture.

According to one aspect of the invention, the method includes determining an orientation of the user's arm, wherein retrieving the input command assigned to the determined gesture is further based on the determined orientation of the user's arm.

According to one aspect of the invention, the method includes determining an orientation of the user's arm, and assigning the retrieved input command to one electronic device of a plurality of electronic devices based on the determined orientation of the user's arm.

According to one aspect of the invention, determining the orientation of the user's arm comprises using at least one of a gyroscope or an accelerometer to determine the orientation.

According to one aspect of the invention, the gesture is performed on the user's forearm, and detecting the distortion of the skin is performed at the user's wrist.

According to one aspect of the invention, the method includes: determining an orientation of the user's arm; and performing the detection step only when the determined orientation corresponds to a predetermined orientation.

According to one aspect of the invention, detecting the distortion of the user's skin surface comprises using an optical device to detect the distortion.

According to one aspect of the invention, the optical device comprises a camera.

According to one aspect of the invention, the optical device is arranged on the user's wrist facing the wrist.

According to one aspect of the invention, the optical device is arranged on the user's wrist facing the user's forearm.

According to one aspect of the invention, the optical device is attached to the user's wrist via a wrist band.

According to one aspect of the invention, the gesture comprises at least one of a single flick of the skin, a double flick of the skin in the same direction, a double flick of the skin in opposing directions, or dragging the skin.

According to one aspect of the invention, the method includes wirelessly communicating the determined gesture to the at least one electronic device.

According to one aspect of the invention, detecting distortion of the user's skin surface comprises detecting movement of the user's skin surface relative to a reference point.

According to one aspect of the invention, detecting motion of the user's skin surface comprises: obtaining a sequence of images corresponding to the user's skin surface; comparing the sequence of images to each other to determine if one or more of the sequence of images differs from the other sequence of images; and concluding there is skin movement when there is a difference between one or more sequence of images.

According to one aspect of the invention, a gesture detection device includes: a processor and memory; a sensor (18) operatively coupled to the processor, the sensor configured to provide to the processor data corresponding to skin distortion; and logic stored in the memory and executable by the processor, the logic including logic configured to detect a distortion of the user's skin surface due to a gesture performed on the user's skin surface based on data provided by the sensor; logic configured to determine a characteristic of the detected distortion; and logic configured to determine a gesture performed on the user's skin surface based on the determined characteristic.

According to one aspect of the invention, the logic configured to determine the gesture includes logic configured to compare the characteristic of the detected skin distortion to a plurality entries stored in a database, each entry including skin distortion data corresponding to skin distortion due to a predetermined gesture.

According to one aspect of the invention, the device includes logic that retrieves an input command assigned to the detected gesture.

According to one aspect of the invention, the device includes logic that determines an orientation of the user's arm, wherein the logic that retrieves the input command assigned to the determined gesture includes logic that retrieves the input command based on the determined orientation of the user's arm.

According to one aspect of the invention, the logic configured to determine the orientation of the user's arm comprises logic that uses at least one of data obtained from an orientation sensor to determine the orientation.

According to one aspect of the invention, the device includes: logic configured to determine an orientation of the user's arm; and logic configured to perform the detection step only when the determined orientation corresponds to a predetermined orientation.

According to one aspect of the invention, the device includes an orientation sensor communicatively coupled to the processor.

According to one aspect of the invention, the sensing device comprises an optical device.

According to one aspect of the invention, the optical device comprises a camera.

According to one aspect of the invention, the device includes an attachment device configured for attachment to a wrist, wherein the sensor is attached to the attachment device.

According to one aspect of the invention, the device includes a wireless transceiver adapted to communicate the determined gesture to another electronic device.

According to one aspect of the invention, the logic configured to determine the characteristic of skin distortion based on data provided by the sensor includes logic configured to determine skin distortion corresponding to at least one of a single flick of the skin, a double flick of the skin in the same direction, a double flick of the skin in opposing directions, or dragging the skin.

According to one aspect of the invention, the logic configured to detect distortion of the user's skin surface comprises logic configured to detect movement of the user's skin surface relative to the sensor.

According to one aspect of the invention, the logic configured to detect motion of the user's skin surface comprises: logic configured to cause a sequence of images corresponding to the user's skin surface to be obtained; logic configured to compare the sequence of images to each other to determine if one or more of the sequence of images differs from the other sequence of images; and logic configured to conclude there is skin movement when there is a difference between one or more sequence of images.

To the accomplishment of the foregoing and the related ends, the device and method comprises the features herein-after fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

BRIEF DESCRIPTION OF THE DRAWINGS

FIG. 1A illustrates a system that includes a gesture detection device in accordance with the present disclosure, where a first gesture is used as an input.

FIG. 1B illustrates the system of FIG. 1A, where a second gesture is used as an input.

FIG. 2A is a bottom view of a gesture detection device in accordance with the present disclosure.

FIG. 2B is a top view of the gesture detection device of FIG. 2A.

FIG. 2C is a perspective view of the gesture detection device of FIG. 2A, where the gesture detection device is formed as a band.

DETAILED DESCRIPTION OF EMBODIMENTS

Figure 3:
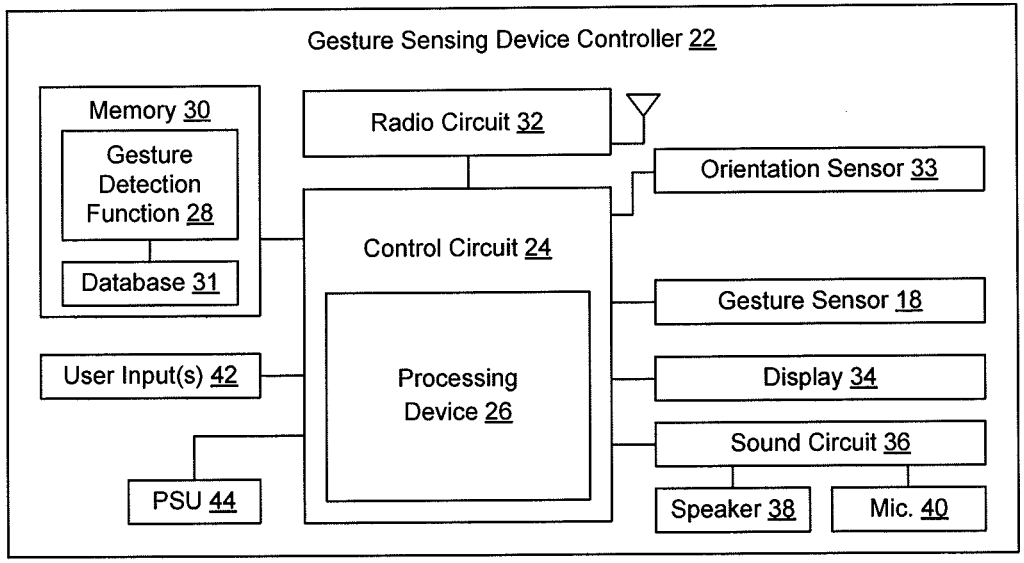
FIG. 3 is a schematic block diagram of modules of a gesture detection device in accordance with the present disclosure.

Embodiments will now be described with reference to the drawings, wherein like reference numerals are used to refer to like elements throughout. It will be understood that the figures are not necessarily to scale. Further, features that are described and/or illustrated with respect to one embodiment may be used in the same way or in a similar way in one or more other embodiments and/or in combination with or instead of the features of the other embodiments.

Described below in conjunction with the appended figures are various embodiments of an apparatus, system and a method for detecting gestures and using the detected gestures as inputs to an electronic device. While embodiments in accordance with the present disclosure relate, in general, to the field of electronic devices, for the sake of clarity and simplicity most embodiments outlined in this specification are described in the context of mobile phones. It should be appreciated, however, that features described in the context of mobile phones are also equally applicable to other electronic devices, including, but not limited to, lap top computers, tablets, wearable devices, intelligent appliances, etc.

With reference to FIGS. 1A and 1B, shown is an exemplary system 10 in accordance with the present disclosure for detecting gestures on the surface of a user's skin (e.g., on the forearm), and interpreting the detected gestures as a specific command. More specifically, a gesture detection device 12 is attached to a user, for example, at the user's wrist. As will be described in more detail below, the gesture detection device 12 includes a sensor for detecting distortions in the user's skin 13 due to gestures performed on the user's skin 13. As used herein, a distortion of the skin is defined as an alteration of the skin surface relative to an undisturbed state of the skin surface. Such distortion may include stretching of the skin (e.g., flattening the skin, removing or minimizing wrinkles in the skin, etc.), compression of the skin (e.g., causing the skin to wrinkle or "bunch up"), and/or movement of the skin in a particular direction (e.g., movement of the skin toward or away from the sensor, or up and/or down relative to the sensor).

For example, a user may perform a "flicking" gesture 14 by placing a finger on the forearm and then "flicking" to the left (FIG. 1A) or to the right (FIG. 1B). The flicking action on the forearm not only causes the skin 13 to distort at the location the gesture 14 is performed (e.g., move left or right relative to the sensor), but also at a distance from the location at which the gesture 14 is performed. As a result, the skin 13 adjacent the sensor is pulled from or pushed toward the sensor. The sensor of the gesture detection device 12 can detect distortion of the user's skin surface due to the gesture and provide the data to a processing device for analysis.

For example, the sensor can provide the raw skin distortion data to the processing device in order to determine a characteristic of the detected skin distortion. Such characteristic may include, for example, data corresponding to movement of one or more points on the surface of the skin relative to the sensor, data corresponding to compression of one or more points on the skin surface relative to the sensor, and/or data corresponding to flattening and/or stretching of one or more points on the surface of the skin relative to the sensor. The data may be in the form of image data (e.g., digital image data) of the skin surface captured over a period of time. Alternatively, the data may comprise information concerning a change in the skin surface. For example, image frames captured over a period of time can be compared to each other and/or to reference data to determine data corresponding to the change in the skin surface, and the data corresponding to the change then can be provided to the image processing device. The processing device may search in a database for data corresponding to the sensor data. For example the processing device may compare the characteristic of the detected skin distortion to a plurality entries stored in a database, each entry including skin distortion data corresponding to skin distortion due to a predetermined gesture. Upon finding a data match, the gesture 14 can be identified and communicated to an electronic device 15, such as a mobile phone. As discussed in more detail below, the gesture detecting device 12 or the electronic device 15 may assign a predetermined input command to the detected gesture, the input command being used by the electronic device 15.

Exemplary gestures 14 that may be detected by the gesture detecting device 12 include dragging/flicking to the left or right, a slow continuous drag gesture to the left or right, a double flick gesture to the left or right, a reverse flick gesture in which the user flicks left then right, or vice versa. As will be appreciated, any number of the above combinations may be performed in a sequence to define a type of gesture.

Once a gesture 14 has been detected, a command associated with the gesture 14 may be retrieved for use by the electronic device 15. As will be appreciated, the number of commands can be endless. Exemplary commands include rejecting or accepting an incoming call, silencing the phone/wearable, creating a bookmark in a life logging application, triggering camera capture (video or a still image), volume control, remote control of other device such as a TV (channel, volume etc.), scrolling in lists or texts (on wearable or remote device), going to the next or previous item (image viewer, or in a card based application), etc.

To enhance accuracy of the gesture detection device 12, the device may include a calibration mode. During calibration mode, for example, the user may wear the gesture detection device 12 and perform a series of predefined gestures. The user may be asked to perform one or more of a flick left gesture, a double flick left gesture, a flick right gesture, a double flick right gesture, a drag left gesture, a drag right gesture, etc. Data corresponding to skin distortion for each type of gesture then may be captured and stored in the database for later use during normal operation mode.

In addition to detecting a gesture 14, the gesture detecting device 12 may also determine an orientation of the user's arm as the gesture 14 is performed. In this manner, different electronic devices can be controlled simply by manipulating a position of the user's arm as the gesture 14 is being performed.

For example, when the arm is horizontal such that the inside of the arm is facing the user, any gesture performed on the arm can be directed to a mobile device (e.g., a mobile phone or a wearable mobile device such as a smart watch, a head set, etc.). When the arm is horizontal such that the inside of the arm is turned up to face the ceiling, any gesture performed on the arm can be directed to a table top user interface (e.g., a computer or the like). When the arm is held vertically, any gesture performed on the arm may be directed to a user interface on a wall.

Alternatively, arm orientation may be used to alter the meaning of a gesture 14. For example, performing a flick-left gesture while the inside of the arm is facing the user may be interpreted as a power on command for a specific electronic device, while performing the same flick-left gesture while the inside of the arm is facing upward may be interpreted as a power off command for the specific electronic device.

In addition to using arm orientation to control different user interfaces, arm orientation also can be used to reduce false positives. More specifically, gestures may be recognized only when the arm is in certain predefined positions. In other words, detection of gestures may be disabled unless the arm is in a recognized orientation. Thus, for example, if the arm is not within a predetermined threshold of completely horizontal or completely vertical, then any detected skin deformation may be ignored.

To determine an orientation of the arm, an accelerometer, gyroscope or like device may be included in the gesture detection device 12. As the user's arm is moved to different orientations, the gesture detection device 12 is correspondingly moved and such corresponding movement can be detected by the orientation sensor and used to determine an orientation of the user's arm.

With additional reference to FIGS. 2A-2C, the gesture detection device 12 is shown in further detail. More particularly, the gesture detection device 12 includes an attachment device 16 that can be formed as a band-portion configured for attachment to a user's wrist. The band portion 16 may include at least portions having elastic properties. In one embodiment the gesture detection device 12 is incorporated in a smart watch.

FIG. 2A illustrates a bottom side 12a of the gesture detection device 12 (i.e., a side that faces the user's wrist when worn on the wrist), the bottom side 12a including a sensing device 18 for sensing distortions in the skin. In one embodiment, the sensing device 18 is an optical device, and preferably is a camera, e.g., camera of the type used to monitor a pulse. In another embodiment, the sensing device 18 is a camera that detects infrared light. In yet another embodiment, the sensing device 18 may be a proximity sensor. The sensing device 18 may be arranged in the center of the band 16, or may be offset to the left or right of a longitudinal centerline of the band 16, may be arranged on an edge of the band (e.g., so as to have a field of view along a surface of the user's forearm when the band is worn on the user's wrist). In one embodiment the sensing device 18 is arranged to face the user's forearm, thereby enabling detection of skin distortion at the location at which the gesture 14 is performed. In another embodiment, the sensing device 18 is arranged to face the user's wrist, thereby enabling detection of skin distortion under the band 16 or immediately adjacent the band 16 (i.e., the sensed skin is separated from the location on the skin on which the gesture 14 is performed). In another embodiment, multiple sensing devices 18 are arranged on the band 16 to monitor the top, bottom, and sides of the arm. Such multiple sensor embodiment is advantageous in that it enables a larger set of gestures to be to be detected.

One end of the band 16 includes a first fastening means 20a, such as one of a hook or loop fastening means. While a hook and look fastening means is described, it should be appreciated that other types of fastening means may be employed without departing from the scope of the invention. For example, the fastening means may be in the form of an adhesive, a buckle, a clasp, or any other known fastening means for attachment of an object to the body. Alternatively, the band 16 may be a "closed" band having elastic properties.

Moving to FIG. 2B, the top side 12b of the gesture detection device 12 is illustrated, and may include a complementary fastening means 20b to that of the bottom side 12a. For example, if the fastening means 20a of the bottom side 12a is a loop-type fastening means, then the fastening means 20b for the top side 12b may be a hook-type fastening means. Also arranged on the top side is a controller 22, which is responsible for instructing the sensing device 18 to obtain data, analyzing the data and/or transmitting the data to another electronic device. While the sensing device 18 and the controller 22 are shown as separate devices, they may be integrated in a common structure.

FIG. 2C illustrates each end of the band 16 coupled to each other to form an annular band.

With reference to FIG. 3, schematically shown is an exemplary controller 22 for the gesture detection device 12 in accordance with the present disclosure. The controller 22 includes a control circuit 24 that is responsible for overall operation of the gesture detection device 12. For this purpose, the control circuit 24 includes a processor 26 that executes various applications, such as a gesture detection function 28 that detects gestures performed on the skin based on skin distortion as described herein. As indicated, the gesture detection function 28 may be implemented in the form of logical instructions that are executed by the processor 26.

The processor 26 of the control circuit 24 may be a central processing unit (CPU), microcontroller or microprocessor. The processor 26 executes code stored in a memory (not shown) within the control circuit 24 and/or in a separate memory, such as a memory 30, in order to carry out operation of the gesture detection device 12. The memory 30 may be, for example, one or more of a buffer, a flash memory, a hard drive, a removable media, a volatile memory, a non-volatile memory, a random access memory (RAM), or other suitable device. In a typical arrangement, the memory 30 includes a non-volatile memory for long term data storage and a volatile memory that functions as system memory for the control circuit 24. The memory 30 may exchange data with the control circuit 24 over a data bus. Accompanying control lines and an address bus between the memory 30 and the control circuit 24 also may be present. The memory 30 is considered a non-transitory computer readable medium.

The memory 30 may optionally include a database 31 for storing data utilized by the gesture detection function 22. Such as data may be data characteristic of skin distortion due to various gestures performed on the user's skin, gestures associated with each type of skin distortion, etc.

As discussed above, the gesture detection device 12 includes the aforementioned sensing device 18 for obtaining data corresponding to skin distortion. The sensing device 18, which may be an optical device such as a camera or the like, may be part of the controller 22. In one embodiment the sensor is a camera used to measure a pulse. Alternatively, the sensing device 18 may be separate from the controller 22 and communicatively coupled thereto so as to receive instructions from the controller 22 and transmit data to the controller 22.

The controller 22 may include communications circuitry that enables the controller 22 to establish various wireless communication connections. In the exemplary embodiment, the communications circuitry includes a radio circuit 32. The radio circuit 32 includes one or more radio frequency transceivers and an antenna assembly (or assemblies). The controller 22 may be capable of communicating using more than one standard. Therefore, the radio circuit 32 represents each radio transceiver and antenna needed for the various supported connection types. The radio circuit 32 further represents any radio transceivers and antennas used for local wireless communications directly with an electronic device, such as over a Bluetooth interface.

The controller 22 is configured to engage in wireless communications using the radio circuit 32, such as data transfers and the like. Data transfers may include, but are not limited to, transmitting detected gestures, commands associated with detected gestures, and/or raw sensor data corresponding to skin distortion due to gestures, receiving data from another electronic device, and so forth.

The controller 22 may include an orientation sensor 33 for determining an orientation of the device 12 (and thus of a user's arm to which the device 12 is attached). The orientation sensor 33 may be in the form of a gyroscope or accelerometer, and may include appropriate circuitry for determining orientation based on data from the gyroscope and/or accelerometer as is conventional.

The controller 22 may optionally include a display 34 for displaying information to a user. The display 34 may be coupled to the control circuit 24 by a video circuit (not shown) that converts video data to a video signal used to drive the display 34. The video circuit may include any appropriate buffers, decoders, video data processors, and so forth.

The controller 22 may optionally include a sound circuit 36 for processing audio signals. Coupled to the sound circuit 36 are a speaker 38 and a microphone 40 that enable a user to listen and speak via the gesture detection device 12, and hear sounds generated in connection with other functions of the device 12. The sound circuit 36 may include any appropriate buffers, encoders, decoders, amplifiers and so forth.

The controller 22 may optionally include one or more user inputs 42 for receiving user input for controlling operation of the gesture detection device 12. Exemplary user inputs include, but are not limited to, a touch input that overlays the display 34 for touch screen functionality, one or more buttons, etc. that may be used to configure the gesture detection device 12.

The controller 22 also includes a power supply 42 for providing power thereto. The power supply 42 may be in the form of a battery, such as a lithium-ion battery or other suitable battery.

Figure 4:
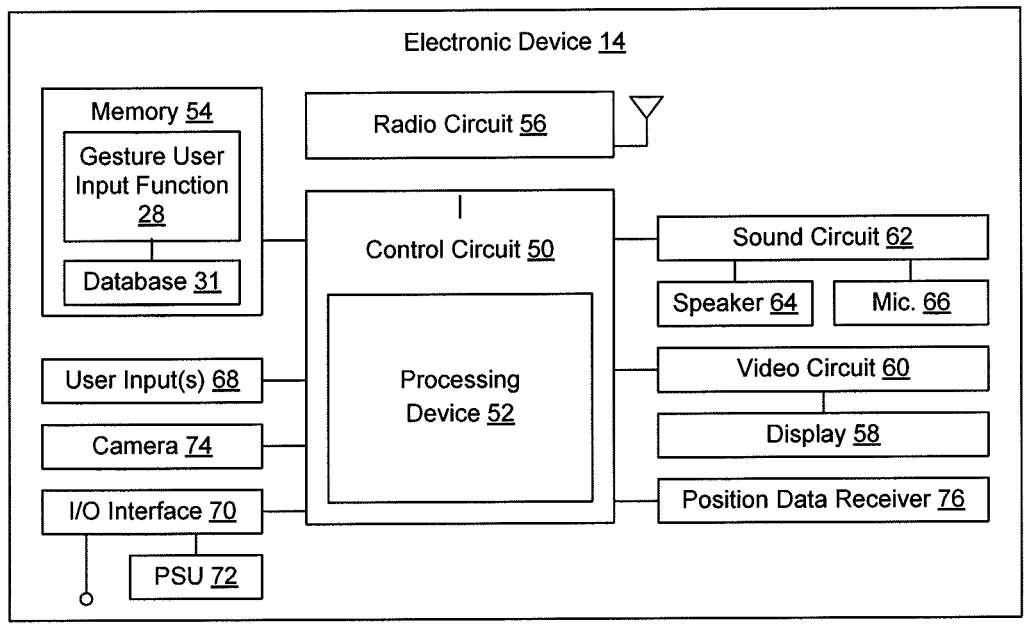
FIG. 4 is a schematic block diagram of modules of an electronic device that can be used with the gesture detection device of FIG. 3.

Referring to FIG. 4, schematically shown is an exemplary electronic device 15 in the form of a mobile phone that may be used with the gesture detection device 15 to form a system. The electronic device 15 includes a control circuit 50 that is responsible for overall operation of the electronic device 15, the control circuit having a processor 52 that executes various applications, such as portions of the gesture detection function 22 described herein. The portions of the gesture detection function 22 may be implemented in the form of logical instructions that are executed by the processor 52.

The processor 52 of the control circuit 50 may be a central processing unit (CPU), microcontroller or microprocessor. The processor 52 executes code stored in a memory (not shown) within the control circuit 50 and/or in a separate memory, such as a memory 54, in order to carry out operation of the electronic device 15. The memory 54 may be, for example, one or more of a buffer, a flash memory, a hard drive, a removable media, a volatile memory, a non-volatile memory, a random access memory (RAM), or other suitable device. In a typical arrangement, the memory 54 includes a non-volatile memory for long term data storage and a volatile memory that functions as system memory for the control circuit 50. The memory 54 may exchange data with the control circuit 50 over a data bus. Accompanying control lines and an address bus between the memory 54 and the control circuit 50 also may be present. The memory 54 is considered a non-transitory computer readable medium.

The memory 54 may optionally include a database 55 for storing data utilized by the gesture detection function 22. Such as data may be data characteristic of skin distortion due to various gestures performed on the user's skin, gestures associated with each type of skin distortion, etc. The database 55 may store data that is the same as, similar to or related to the data stored in the database 31.

The electronic device 15 may include communications circuitry that enables the electronic device 15 to establish various wireless communication connections. In the exemplary embodiment, the communications circuitry includes a radio circuit 56. The radio circuit 56 includes one or more radio frequency transceivers and an antenna assembly (or assemblies). The electronic device 15 may be capable of communicating using more than one standard. Therefore, the radio circuit 56 represents each radio transceiver and antenna needed for the various supported connection types. The radio circuit 56 further represents any radio transceivers and antennas used for local wireless communications directly with an electronic device, such as over a Bluetooth interface.

The electronic device 15 is configured to engage in wireless communications using the radio circuit 56, such as voice calls, data transfers, and the like. Data transfers may include, but are not limited to, receiving gesture data from the gesture detection device 12, receiving or sending messages (e.g., chat-style messages, electronic mail messages, multimedia messages), and so forth.

Wireless communications may be handled through a subscriber network, which is typically a network deployed by a service provider with which the user of the electronic device 15 subscribes for phone and/or data service. Communications between the electronic device 15 and the subscriber network may take place over a cellular circuit-switched network connection. Exemplary interfaces for cellular circuit-switched network connections include, but are not limited to, global system for mobile communications (GSM), code division multiple access (CDMA), wideband CDMA (WCDMA), and advanced versions of these standards. Communications between the electronic device 10 and the subscriber network also may take place over a cellular packet-switched network connection that supports IP data communications. Exemplary interfaces for cellular packet-switched network connections include, but are not limited to, general packet radio service (GPRS) and 4G long-term evolution (LTE).

The cellular circuit-switched network connection and the cellular packet-switched network connection between the electronic device 15 and the subscriber network may be established by way of a transmission medium (not specifically illustrated) of the subscriber network. The transmission medium may be any appropriate device or assembly, but is typically an arrangement of communications base stations (e.g., cellular service towers, also referred to as "cell" towers). The subscriber network includes one or more servers for managing calls placed by and destined to the electronic device 15, transmitting data to and receiving data from the electronic device 15, and carrying out any other support functions. As will be appreciated, the server may be configured as a typical computer system used to carry out server functions and may include a processor configured to execute software containing logical instructions that embody the functions of the server and a memory to store such software and related data.

Another way for the electronic device 15 to access the Internet and conduct other wireless communications is by using a packet-switched data connection apart from the subscriber network. For example, the electronic device 15 may engage in IP communication by way of an IEEE 802.11 (commonly referred to as WiFi) access point (AP) that has connectivity to the Internet.

The electronic device 15 may further include a display 58 for displaying information to a user. The displayed information may include the second screen content. The display 58 may be coupled to the control circuit 50 by a video circuit 60 that converts video data to a video signal used to drive the display 58. The video circuit 60 may include any appropriate buffers, decoders, video data processors, and so forth.

The electronic device 15 may further include a sound circuit 63 for processing audio signals. Coupled to the sound circuit 62 are a speaker 64 and a microphone 66 that enable a user to listen and speak via the electronic device 15, and hear sounds generated in connection with other functions of the device 15. The sound circuit 62 may include any appropriate buffers, encoders, decoders, amplifiers and so forth.

The electronic device 15 also includes one or more user inputs 68 for receiving user input for controlling operation of the electronic device 15. Exemplary user inputs include, but are not limited to, a touch input that overlays the display 58 for touch screen functionality, one or more buttons, motion sensors (e.g., gyro sensors, accelerometers), and so forth.

The electronic device 15 may further include one or more input/output (I/O) interface(s) 70. The I/O interface(s) 70 may be in the form of typical electronic device I/O interfaces and may include one or more electrical connectors for operatively connecting the electronic device 15 to another device (e.g., a computer) or an accessory (e.g., a personal handsfree (PHF) device) via a cable. Further, operating power may be received over the I/O interface(s) 15 and power to charge a battery of a power supply unit (PSU) 72 within the electronic device 15 may be received over the I/O interface(s) 70. The PSU 72 may supply power to operate the electronic device 10 in the absence of an external power source.

The electronic device 15 also may include various other components. For instance, a camera 74 may be present for taking digital pictures and/or movies. Image and/or video files corresponding to the pictures and/or movies may be stored in the memory 54. As another example, a position data receiver 76, such as a global positioning system (GPS) receiver, may be present to assist in determining the location of the electronic device 15.

Figure 5:
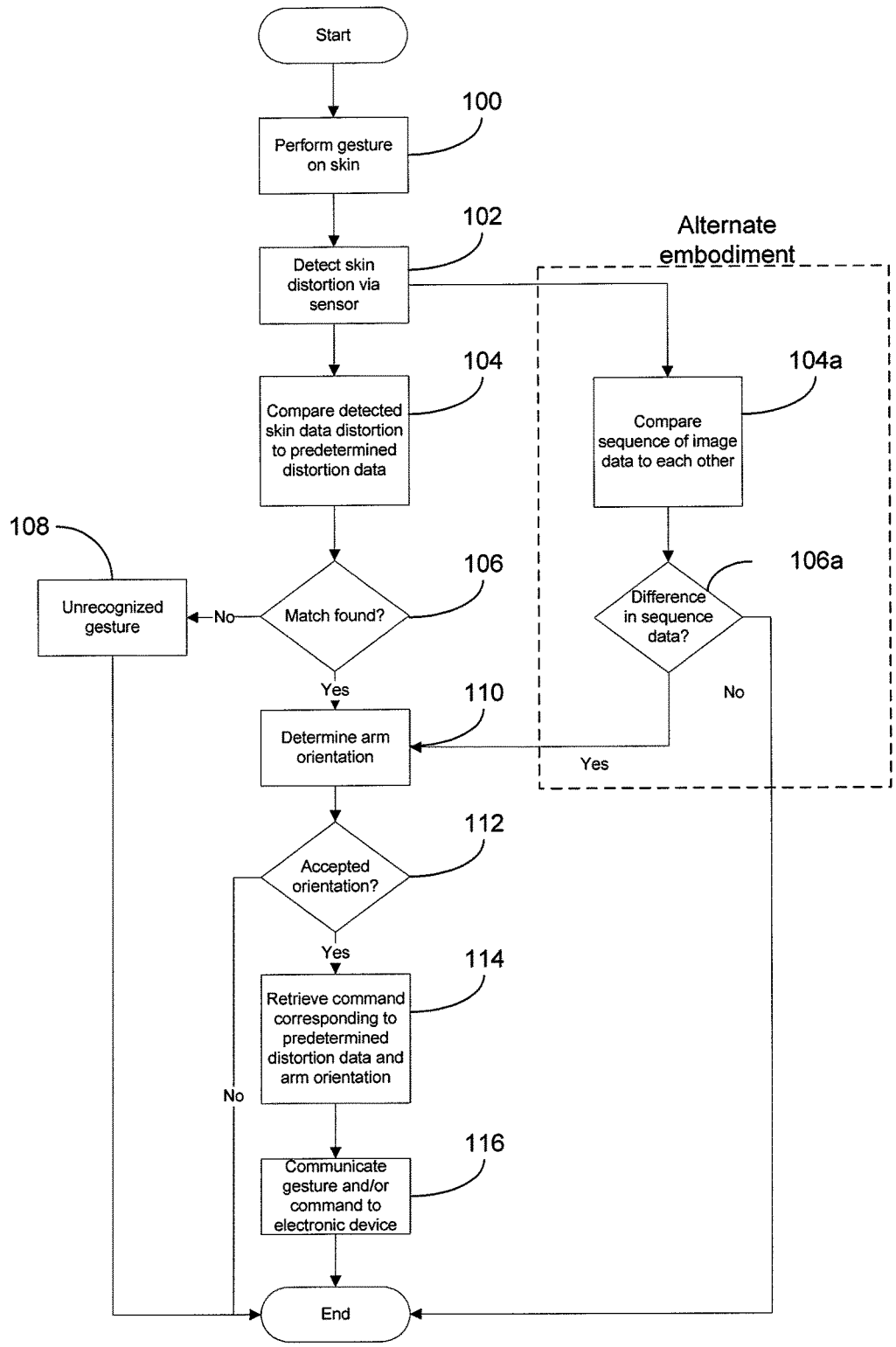
FIG. 5 is a flow diagram illustrating an exemplary method of detecting gestures via skin distortion and assigning commands to the detected gestures in accordance with the present disclosure.

With additional reference to FIG. 5, illustrated are logical operations to implement an exemplary method for detecting gestures performed on a user's skin. The exemplary method may be carried out by executing an embodiment of the gesture detection function 28, for example. Thus, the flow chart of FIG. 5 may be thought of as depicting steps of a method carried out by the controller 22 of the gesture detection device 12. It is noted that while certain steps of the flow chart are described as being implemented by the controller 22 of the gesture detection device 12, portions of the steps shown in FIG. 5 may be implemented elsewhere, e.g., in another electronic device 15 such as a mobile phone or the like.

Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the gesture detection function 28 may begin at block 100 where a gesture is performed on the user's skin. For example, and as described herein, the user may perform any one of a number of different gestures on the surface of the skin. Such gestures may include one or more of flicking a finger on the skin in a particular direction relative to the sensor 18, dragging the finger over the skin in a particular direction relative to the sensing device 18, etc. At block 102, distortion in the skin due to the gesture 14 is detected via the sensing device 18, which may be an optical device such as a camera worn on the wrist. For example, if a flick gesture is performed such that the user's finger is placed on the skin and then flicked toward the gesture detection device 12, a portion of the skin surface monitored by the sensor 18 may move toward the sensor 18, bunch up or wrinkle, and the sensor 18 can collect data corresponding skin distortion. Similarly, if the user's finger is placed on the arm and flicked away from the gesture detection device 12, a portion of the skin surface monitored by the sensor 18 will move away from the sensor, stretch or otherwise become less wrinkled. The captured data corresponding to the skin distortion is then compared to skin distortion data stored, for example, in a database as indicated at block 104. In one embodiment the database is in the form of a lookup table. Alternatively, and as shown in blocks 104*a* and 106*a*, the captured data is analyzed (without the use of a database) to determine if there is movement of one or more points on the surface of the skin relative to the sensor 18. Such analysis can be performed, for example, by capturing a series of images of the skin surface and performing a comparison of the images. If a particular point on the surface of the skin has moved between image frames, such information will be evident from the comparison and a direction of the motion can be determined.

At block 106 it is determined if a match exists between the data captured by the sensing device 18 and the data stored in the database. If a match is not found, then at block 108 the user may be notified that the gesture 14 is not understood and the process ends. The user may then reattempt the gesture 14 at block 100 and the method may repeat.

If a match between the data captured by the sensing device 18 and the data stored in the database is found, then optionally at block 110 the orientation of the user's arm at the time the gesture 14 was performed may be determined. As noted herein, such orientation may be determined using the orientation sensor 33 of the gesture detection device 12.

Optionally at block 112, if the orientation of the arm is not in an accepted orientation (e.g., the arm is not in one of a number of predetermined accepted orientations such as horizontal, vertical, etc.) then it may be concluded that the detected gesture was a false positive and the method may end. If it is concluded the orientation of the arm corresponds to an accepted orientation, then at block 114 the command corresponding to the determined gesture 14 also may be retrieved from the database.

For example, if a flick left gesture has associated therewith a power on function and a flick right gesture has associated therewith a power off function, such respective functions may be stored with the respective gesture data in the database. As a match between the captured data and the data stored in the database is found, the associated function can be retrieved from the database.

Retrieval of the command, in addition to being based on the detected gesture, also may be based on the arm orientation at the time the gesture 14 is performed. For example, a flick left gesture while the inner arm is in the horizontal position and facing the user may have associated therewith a POWER ON function for a first device (e.g., device "A"), while the same gesture 14 performed while the inner arm is facing up toward the ceiling may have associated therewith a POWER ON function for a second device (e.g., device "B"). Thus, the database, in addition to having commands assigned based on the detected gesture, may also have commands assigned based on the orientation of the arm.

At block 116 the detected gesture and/or the associated command may be communicated to an electronic device 15, for example, via the radio circuit 32.

In an alternate embodiment, the gesture detection device 12 communicates the detected gesture and/or arm orientation to the electronic device 15. The electronic device 15 then may determine the command associated with the detected gesture and/or arm orientation, independent of the gesture detection device. For example, blocks 112 and 114 may be performed by the electronic device, while the remaining blocks may be performed by the gesture detection device 12. In yet another embodiment, the gesture detection device 12 collects data corresponding to the skin distortion (blocks 100 and 102), and forwards the collected data to the electronic device 15 (block 116). The electronic device 15 then may perform steps identified in blocks 104-114.

Accordingly, a gesture detection apparatus, system and method have been described that enable gestures performed on the skin to be detected and communicated to an electronic device. The gestures can be associated with specific commands that can be used to operate the electronic device 15.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. The computer program product and any software and hardware described herein form the various means for carrying out the functions of the invention in the example embodiments.

What is claimed is:

1. A method of determining a gesture performed by a user, the method comprising:
    using a camera to obtain a sequence of images of a skin surface of the user;
    comparing the sequence of images to each other to detect a distortion of the skin surface in a lateral direction relative to the camera, the distortion due to a gesture performed on the user's skin surface, wherein:
        the distortion of the skin surface comprises at least one of a wrinkling of the skin surface, a flattening of the skin surface, or a lateral movement of the skin surface relative to the camera;
        determining the distortion of the skin includes determining a characteristic of the detected distortion based on a determined movement of one or more points on the skin surface;
        determining the characteristic comprises:
            for each of the sequence of images, identifying the one or more points on the skin surface relative to the camera; and
            determining the movement of the one or more points by comparing a lateral position of each of the one or more points relative to the camera in the sequence of images, wherein the determined movement comprises at least one of lateral movement of the one or more points relative to the camera, compression of the one or more points on the skin surface relative to the camera, flattening of the one or more points on the skin surface relative to the camera, or stretching of the one or more points on the skin surface relative to the camera; and
    based on the determined characteristic, determining the gesture performed on the user's skin surface.

2. The method according to claim 1, wherein determining the gesture includes comparing the characteristic of the detected distortion of the skin surface to a plurality entries stored in a memory, each entry including skin distortion data corresponding to distortion of the skin surface due to a predetermined gesture.

3. The method according to claim 1, wherein the gesture is performed on a forearm of the user, and detecting the distortion of the skin is performed at a wrist of the user.

4. The method according to claim 1, wherein detecting the distortion of the skin surface comprises using an optical device to detect the distortion.

5. The method according to claim 1, wherein the gesture comprises at least one of a single flick of the user's skin surface, a double flick of the user's skin surface in the same direction, a double flick of the user's skin surface in opposing directions, or dragging the user's skin surface.

6. The method according to claim 1, wherein detecting distortion of the skin surface comprises detecting movement of the skin surface relative to a reference point.

7. The method according to claim 6, further comprising:
    concluding there is skin movement when there is a difference between one or more sequence of images.

8. A gesture detection device, comprising:
    a processor and memory;
    a camera operatively coupled to the processor, the camera configured to provide to the processor image data corresponding to skin distortion; and
    logic stored in the memory and executable by the processor, the logic configured to:
        cause the camera to capture a sequence of images of a skin surface of a user;
        compare the sequence of images to each other to detect a distortion of the skin surface in a lateral direction relative to the camera, the distortion due to a gesture performed on the skin surface, wherein the distortion of the skin surface comprises at least one of a wrinkling of the skin surface, a flattening of the skin surface, or a lateral movement of the skin surface relative to the camera;
        determine a characteristic of the detected distortion based on a determined movement of one or more points on the skin surface, the determining comprising:
            for each of the sequence of images, identify the one or more points on the skin surface relative to the camera; and
            determine the movement of the one or more points by comparing a lateral position of each of the one or more points relative to the camera in the sequence of images, wherein the determined movement comprises at least one of lateral movement of the one or more points relative to the camera, compression of the one or more points on the skin surface relative to the camera, flattening of the one or more points on the skin surface relative to the camera, or stretching of the one or more points on the skin surface relative to the camera; and
        determine a gesture performed on the skin surface based on the determined characteristic.

9. The detection device according to claim 8, wherein the logic is configured to determine the gesture by comparing the characteristic of the detected distortion to a plurality entries stored in the memory, each entry including skin distortion data having a characteristic corresponding to skin distortion due to a predetermined gesture.

10. The device according to claim 9, further comprising an attachment device configured for attachment to a wrist, wherein the camera is attached to the attachment device.

11. The device according to claim 9, wherein the logic configured to determine the characteristic of detected distortion based on image data provided by the camera includes logic configured to determine skin distortion corresponding to at least one of a single flick of the user's skin surface, a double flick of the user's skin surface in the same direction, a double flick of the user's skin surface in opposing directions, or dragging the user's skin surface.

12. The device according to claim 9, wherein the logic configured to detect distortion of the user's skin surface comprises logic configured to detect movement of the user's skin surface relative to the camera.

13. The device according to claim 12, further comprising: logic configured to conclude there is skin movement when there is a difference between one or more sequence of images.

14. The device according to claim 9, wherein the logic is further configured to:
determine an orientation of an arm of the user; and
logic that assigns an input command based on i) the determined gesture and ii) the determined orientation of the arm of the user, wherein:
when the arm of the user is determined to be in a first orientation, the assigned input command corresponds to a first command, and
when the arm of the user is determined to be in a second orientation different from the first orientation, the assigned input command corresponds to a second command different from the first command.

15. The device according to claim 14, further comprising: assigning the assigned input command to one electronic device of a plurality of electronic devices based on the determined orientation of the user's arm.

16. The device according to claim 14, further comprising: performing the detection step only when the determined orientation corresponds to a predetermined orientation.

17. The device according to claim 14, wherein the logic configured to determine the orientation of the user's arm comprises logic that uses at least one of data obtained from an orientation sensor to determine the orientation.

18. The device according to claim 14, further comprising: logic configured to perform the compare step only when the determined orientation corresponds to a predetermined orientation.

* * * * *